United States Patent
Hosomi et al.

(10) Patent No.: US 12,361,717 B2
(45) Date of Patent: Jul. 15, 2025

(54) MOBILE OBJECT CONTROL DEVICE, MOBILE OBJECT CONTROL METHOD, TRAINING DEVICE, TRAINING METHOD, GENERATION DEVICE, AND STORAGE MEDIUM

(71) Applicants: HONDA MOTOR CO., LTD., Tokyo (JP); KEIO UNIVERSITY, Tokyo (JP)

(72) Inventors: Naoki Hosomi, Wako (JP); Teruhisa Misu, San Jose, CA (US); Kentaro Yamada, Wako (JP); Shumpei Hatanaka, Yokohama (JP); Wei Yang, Yokohama (JP); Komei Sugiura, Yokohama (JP)

(73) Assignees: HONDA MOTOR CO., LTD., Tokyo (JP); KEIO UNIVERSITY, Tokyo (JP)

( * ) Notice: Subject to any disclaimer, the term of this patent is extended or adjusted under 35 U.S.C. 154(b) by 408 days.

(21) Appl. No.: 17/895,119

(22) Filed: Aug. 25, 2022

(65) Prior Publication Data
US 2024/0071090 A1 Feb. 29, 2024

(51) Int. Cl.
*G06V 20/56* (2022.01)
*G05D 1/00* (2006.01)
*G06V 10/774* (2022.01)

(52) U.S. Cl.
CPC ........... *G06V 20/56* (2022.01); *G05D 1/0246* (2013.01); *G06V 10/774* (2022.01)

(58) Field of Classification Search
CPC ....... G06V 20/56; G06V 10/774; G05D 1/243
See application file for complete search history.

(56) References Cited

U.S. PATENT DOCUMENTS

2019/0039607 A1* 2/2019 Terashima ........... G05D 1/0055

FOREIGN PATENT DOCUMENTS

JP 2020-190930 11/2020

OTHER PUBLICATIONS

Frome, Andrea, et al. "Devise: A deep visual-semantic embedding model." Advances in neural information processing systems 26 (2013). (Year: 2013).*

(Continued)

*Primary Examiner* — Stephen R Koziol
*Assistant Examiner* — Ashley L. Hytrek
(74) *Attorney, Agent, or Firm* — Amin, Turocy & Watson, LLP

(57) ABSTRACT

A mobile object control device including a storage medium and a processor connected to the storage medium is presented. The processor acquires a photographed image, which is obtained by photographing surroundings of a mobile object by a camera mounted on the mobile object, and an input instruction sentence, which is input by a user of the mobile object; detects a stop position of the mobile object corresponding to the input instruction sentence in the photographed image by inputting at least the photographed image and the input instruction sentence into a trained model including a pre-trained visual-language model, the trained model being trained so as to receive input of at least an image and an instruction sentence to output a stop position of the mobile object corresponding to the instruction sentence in the image; and causes the mobile object to travel to the stop position.

11 Claims, 8 Drawing Sheets

(56) References Cited

OTHER PUBLICATIONS

Huang, Y., Wu, Q., Song, C., & Wang, L. (Jun. 2018). Learning Semantic Concepts and Order for Image and Sentence Matching. Proceedings of the IEEE Conference on Computer Vision and Pattern Recognition (CVPR). (Year: 2018).*

Y. Huang, Y. Wang and L. Wang, "Efficient Image and Sentence Matching," in IEEE Transactions on Pattern Analysis and Machine Intelligence, vol. 45, No. 3, pp. 2970-2983, Mar. 1, 2023, doi: 10.1109/TPAMI.2022.3178485. (Year: 2022).*

Saha H, Fotouhi F, Liu Q, Sarkar S. A Modular Vision Language Navigation and Manipulation Framework for Long Horizon Compositional Tasks in Indoor Environment. Front Robot AI. 2022;9:930486. Published Jul. 13, 2022. doi: 10.3389/frobt.2022.930486 (Year: 2022).*

Deruyttere, et al. "Talk2car: Taking control of yourself-driving car," EMNLP IJCNLP, pp. 2088-2098, 2019.

Rufus, et al. "Grounding linguistic commands to navigable regions," IROS, pp. 8593-8600, 2021.

* cited by examiner

DETAILED CONFIGURATION OF TRAINED MODEL 73

MOBILE OBJECT CONTROL DEVICE, MOBILE OBJECT CONTROL METHOD, TRAINING DEVICE, TRAINING METHOD, GENERATION DEVICE, AND STORAGE MEDIUM

BACKGROUND

Field of the Invention

The present invention relates to a mobile object control device, a mobile object control method, a training device, a training method, a generation device, and a storage medium.

Description of Related Art

Hitherto, the technology of using an instruction sentence given by a person and an input image to identify an object in the input image has been known. For example, Japanese Patent Application Laid-Open No. 2020-190930 discloses the technology of acquiring a command sentence relating to a specific object, and extracting, from an input image associated with the command sentence, a partial image representing an individual object included in the input image. T. Deruyttere, S. Vandenhende, D. Grujicic, et al., "Talk2car: Taking control of your self driving car," EMNLP IJCNLP, pp. 2088-2098, 2019. discloses the technology of detecting a landmark in an input image on the basis of an instruction sentence as a reference expression comprehension (REC) task. N. Rufus, K. Jain, U. K. R. Nair, V. Gandhi, and K. M. Krishna, "Grounding linguistic commands to navigable regions," IROS, pp. 8593-8600, 2021. discloses the technology of predicting the region of a target position on the basis of an instruction sentence.

SUMMARY

The conventional technologies described above process the feature of an instruction sentence and the feature of an input image using different models (different feature spaces) and then integrating these features to identify an object or position (late fusion). In that case, in particular, when a large amount of training data is not prepared, a wide variety of collaborative representations between a language and an image cannot be learned, resulting in a failure to learn the correspondence relationship preferably in some cases.

Furthermore, for example, in driving control of a mobile object, it is necessary to specify a stop position of the mobile object on the basis of an instruction sentence given by an occupant and an input image. However, the stop position of the mobile object cannot be specified uniquely with the method of predicting a distribution or region of the target position as in the case of the technology described in N. Rufus, K. Jain, U. K. R. Nair, V. Gandhi, and K. M. Krishna, "Grounding linguistic commands to navigable regions," IROS, pp. 8593-8600, 2021, resulting in a failure to utilize the technology for driving control of the mobile object in some cases.

The present invention has been made in view of the above-mentioned circumstances, and has an object to provide a mobile object control device, a mobile object control method, a training device, a training method, a generation device, and a storage medium, which are capable of uniquely specifying the stop position of a mobile object by using a trained model that has learned the correspondence relationship between a language and an image preferably.

The mobile object control device, the mobile object control method, the training device, the training method, the generation device, and the storage medium according to the present invention adopt the following configurations.

(1): A mobile object control device according to an aspect of the present invention includes a storage medium storing a computer-readable command and a processor connected to the storage medium, the processor executing the computer-readable command to: acquire a photographed image, which is obtained by photographing surroundings of a mobile object by a camera mounted on the mobile object, and an input instruction sentence, which is input by a user of the mobile object; detect a stop position of the mobile object corresponding to the input instruction sentence in the photographed image by inputting at least the photographed image and the input instruction sentence into a trained model including a pre-trained visual-language model, the trained model being trained so as to receive input of at least an image and an instruction sentence to output a stop position of the mobile object corresponding to the instruction sentence in the image; and cause the mobile object to travel to the stop position.

(2): In the aspect (1), the trained model is trained so as to receive input of the photographed image, the input instruction sentence, and a landmark corresponding to the input instruction sentence to output the stop position of the mobile object corresponding to the instruction sentence in the photographed image.

(3): In the aspect (1), the trained model includes a fully connected layer that is connected to an output layer of the pre-trained visual-language model and outputs the stop position as coordinate information.

(4): A mobile object control method to be executed by a computer according to an aspect of the present invention includes acquiring a photographed image, which is obtained by photographing surroundings of a mobile object by a camera mounted on the mobile object, and an input instruction sentence, which is input by a user of the mobile object; detecting a stop position of the mobile object corresponding to the input instruction sentence in the photographed image by inputting at least the photographed image and the input instruction sentence into a trained model including a pre-trained visual-language model, the trained model being trained so as to receive input of at least an image and an instruction sentence to output a stop position of the mobile object corresponding to the instruction sentence in the image; and causing the mobile object to travel to the stop position.

(5): A non-transitory computer-readable storage medium according to an aspect of the present invention stores a program for causing a computer to: acquire a photographed image, which is obtained by photographing surroundings of a mobile object by a camera mounted on the mobile object, and an input instruction sentence, which is input by a user of the mobile object; detect a stop position of the mobile object corresponding to the input instruction sentence in the photographed image by inputting at least the photographed image and the input instruction sentence into a trained model including a pre-trained visual-language model, the trained model being trained so as to receive input of at least an image and an instruction sentence to output a stop position of the mobile object corresponding to the instruction sentence in the image; and cause the mobile object to travel to the stop position.

(6): A training device according to an aspect of the present invention includes a storage medium storing a computer-readable command and a processor connected to the storage medium, the processor executing the computer-readable command to: acquire training data associating at least an image and an instruction sentence with an annotation indicating a stop position of a mobile object corresponding to the instruction sentence in the image; and perform training based on the training data and a pre-trained visual-language model so as to receive input of at least an image and an instruction sentence to output a stop position of the mobile object corresponding to the instruction sentence in the image.

(7): In the aspect (6), the processor is configured to use training data associating the image, the instruction sentence, and a landmark corresponding to the instruction sentence with an annotation indicating a stop position of the mobile object corresponding to the instruction sentence in the image to perform training so as to receive input of the image, the instruction sentence, and a landmark corresponding to the instruction sentence to output a stop position of the mobile object corresponding to the instruction sentence in the image.

(8): In the aspect (6), a fully connected layer is connected to an output layer of the pre-trained visual-language model and outputs the stop position as coordinate information, and the processor is configured to train parameters of the fully connected layer so as to decrease a value of a loss function that represents a distance between the annotation and the coordinate information.

(9): In the aspect (8), the loss function receives a continuous value as an input value.

(10): A training method to be executed by a computer according to an aspect of the present invention includes using a pre-trained visual-language model and training data associating at least an image and an instruction sentence with an annotation indicating a stop position of a mobile object corresponding to the instruction sentence in the image to perform training so as to receive input of at least an image and an instruction sentence to output a stop position of the mobile object corresponding to the instruction sentence in the image.

(11): A non-transitory computer-readable storage medium according to an aspect of the present invention stores a program for causing a computer to use a pre-trained visual-language model and training data associating at least an image and an instruction sentence with an annotation indicating a stop position of a mobile object corresponding to the instruction sentence in the image to perform training so as to receive input of at least an image and an instruction sentence to output a stop position of the mobile object corresponding to the instruction sentence in the image.

(12): A generation device according to an aspect of the present invention is configured to generate, from at least an image and a stop position of a mobile object, an instruction sentence corresponding to the stop position in the image by using a trained model that is trained so as to receive input of at least an image and an instruction sentence to output a stop position of a mobile object corresponding to the instruction sentence in the image based on a pre-trained visual-language model and training data associating at least an image and an instruction sentence with an annotation indicating a stop position of a mobile object corresponding to the instruction sentence in the image.

According to the aspects (1) to (5), it is possible to uniquely specify the stop position of a mobile object by using a trained model that has learned the correspondence relationship between a language and an image preferably.

According to the aspects (6) to (11), it is possible to generate a trained model capable of uniquely specifying the stop position of a mobile object by learning a correspondence relationship between a language and an image preferably.

According to the aspect (12), it is possible to generate a target position representation from an image by applying a visual-language model.

DESCRIPTION OF EMBODIMENTS

Figure 1:
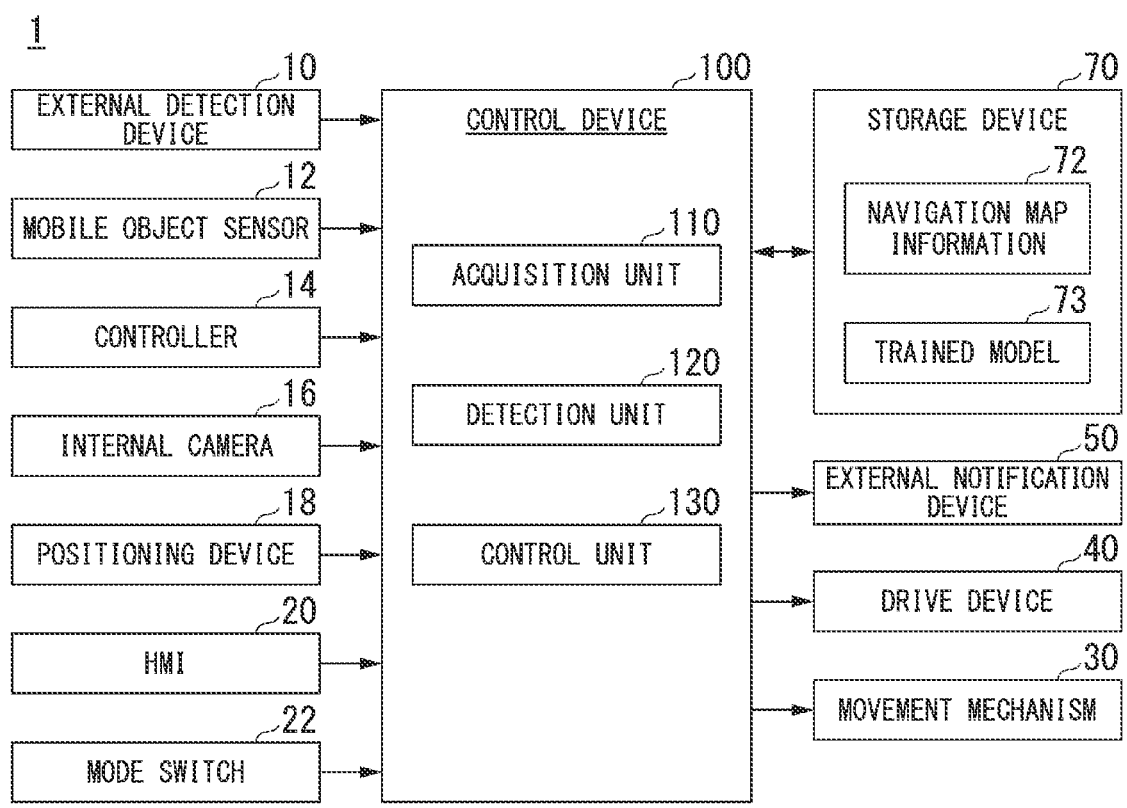
FIG. 1 is a diagram illustrating an exemplary configuration of a mobile object and control device according to an embodiment.

Now, referring to the drawings, description is given of a mobile object control device, a mobile object control method, a training device, a training method, a generation device, and a program according to an embodiment of the present invention. The mobile object control device is mounted on a mobile object. The mobile object travels on both of a vehicle road and a predetermined area different from the vehicle road. The mobile object is sometimes referred to as "micro mobility". An electric scooter is a type of the micro mobility. The predetermined area is, for example, a pedestrian road. Further, the predetermined area may be a part or all of roadside strips, bicycle lanes, and public open spaces, and the like, or may include all of the pedestrian road, roadside strips, bicycle lanes, and public open spaces, and the like. In the following description, it is assumed that the predetermined area is a pedestrian road. The part described as "pedestrian road" in the following description can be replaced with "predetermined area" as appropriate.

[Overall Configuration]

FIG. 1 is a diagram illustrating an exemplary configuration of a mobile object 1 and a control device 100 according to an embodiment. The mobile object 1 includes, for example, an external detection device 10, a mobile object sensor 12, a controller 14, an internal camera 16, a positioning device 18, an HMI 20, a mode switch 22, a movement mechanism 30, a drive device 40, an external notification device 50, a storage device 70, and a control device 100. A part of components not indispensable for implementing the features of the present invention may be omitted among those components. The mobile object is not limited to a vehicle, and may include such a small mobility as to carry baggage alongside a walking user or guide the user, or may include other mobile objects (for example, walking robots) capable of autonomous movement.

The external detection device 10 includes various kinds of devices having the traveling direction of the mobile object 1 as its detection range. The external detection device 10 includes, for example, an external camera, a radar device, a LIDAR (Light Detection and Ranging) device, and a sensor fusion device. The external detection device 10 outputs information indicating detection results (image, object position, and other information) to the control device 100. In particular, in this embodiment, it is assumed that the external detection device 10 outputs a photographed image, which is obtained by photographing the surroundings of the mobile object 1 by the external camera, to the control device 100.

The mobile object sensor 12 includes, for example, a speed sensor, an acceleration sensor, a yaw rate (angular velocity) sensor, an azimuth sensor, and an operation amount detection sensor mounted to the controller 14. The controller 14 may include, for example, a controller (for example, acceleration pedal or brake pedal) for giving an instruction to accelerate/decelerate, and a controller (for example, steering wheel) for giving an instruction to perform steering. In this case, the mobile object sensor 12 may include an acceleration position sensor, a brake depression amount sensor, a steering torque sensor, and other sensors. The mobile object 1 may include, as the controller 14, a controller (for example, non-circular rotary controller, joystick, button, or the like) other than those described above.

The internal camera 16 photographs at least the head of the occupant of the mobile object 1 from the front. The internal camera 16 is a digital camera using an image pickup device such as a CCD (Charge Coupled Device) device or a CMOS (Complementary Metal Oxide Semiconductor) device. The internal camera 16 outputs the picked up image to the control device 100.

The positioning device 18 is a device that measures the position of the mobile object 1. The positioning device 18 is, for example, a GNSS (Global Navigation Satellite System) receiver, and identifies the position of the mobile object 1 based on a signal received from the GNSS receiver to output the identified position as position information. The position information of the mobile object 1 may be estimated from the position of a Wi-Fi base station to which a communication device described later is connected.

The HMI 20 includes, for example, a display device, a speaker, a touch panel, and a key. For example, the occupant of the mobile object 1 sets the destination of the mobile object 1 via the HMI 20, and a controller 130 described later causes the mobile object 1 to travel to the set destination. In particular, in this embodiment, it is assumed that the HMI 20 includes a sound input device such as a microphone, and the occupant of the mobile object 1 utters an instruction sentence indicating the stop position of the mobile object 1, to thereby input the instruction sentence into the sound input device. The HMI 20 analyzes the input sound of the instruction sentence to obtain text thereof, and outputs the text to the control device 100. Alternatively, for example, the HMI 20 may receive the instruction sentence, which is input by the occupant as text, via a touch panel, and output the received instruction sentence to the control device 100.

The mode switch 22 is a switch that is operated by the occupant. The mode switch 22 may be a mechanical switch, or a GUI (Graphical User Interface) switch set on the touch panel of the HMI 20. The mode switch 22 receives an operation of switching between driving modes including a mode A, which is an assist mode in which one of a steering operation and an acceleration/deceleration control is performed by the occupant and the other is performed automatically (in mode A-1, a steering operation is performed by the occupant and acceleration/deceleration control is performed automatically, whereas in mode A-2, acceleration/deceleration control is performed by the occupant and a steering operation is performed automatically), a mode B, which is a manual driving mode in which a steering operation and acceleration/deceleration control are performed by the occupant, and a mode C, which is an automatic driving mode in which a steering operation and acceleration/deceleration control are performed automatically.

The movement mechanism 30 is a mechanism for causing the mobile object 1 to move on a road. The movement mechanism 30 is, for example, a group of wheels including steered wheels and drive wheels. Further, the movement mechanism 30 may be legs for multi-legged walking.

The drive device 40 outputs a force to the movement mechanism 30 to cause the mobile object 1 to move. For example, the drive device 40 includes a motor for driving a drive wheel, a battery for storing power to be supplied to the motor, and a steering device for adjusting the steering angle of the steered wheel. The drive device 40 may include, for example, an internal combustion engine or a fuel battery as drive force output means or power generation means. The drive device 40 may further include a brake device that operates by using a friction force or air resistance.

The external notification device 50 is, for example, a lamp, display device, or speaker that is installed on an external plate of the mobile object 1 and provides information to the outside of the mobile object 1. The external notification device 50 operates differently between when the mobile object 1 is moving on a sidewalk and when the mobile object 1 is moving on a roadway. For example, the external notification device 50 is controlled so as to cause the lamp to emit light when the mobile object 1 is moving a sidewalk or cause the lamp not to emit light when the mobile object 1 is moving on a roadway. The color of light emitted by this lamp is preferably a color defined in law. The external notification device 50 may be controlled so as to cause the lamp to emit green light when the mobile object 1 is moving a sidewalk or cause the lamp not to emit blue light when the mobile object 1 is moving on a roadway. When the external notification device 50 is a display device, the external notification device 50 displays text or graphic indicating that "the mobile object 1 is traveling on a sidewalk" when the mobile object 1 is traveling on a sidewalk.

Figure 2:
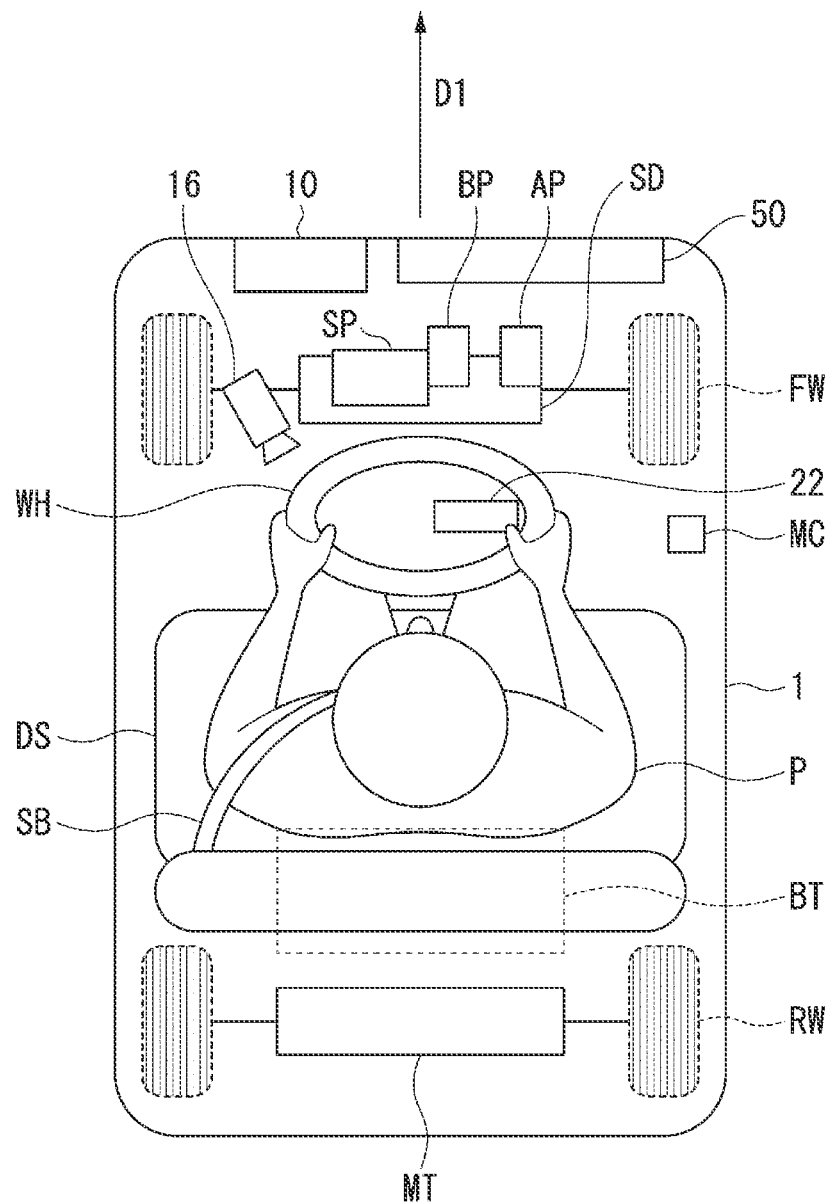
FIG. 2 is a perspective view of the mobile object 1 from the above.

FIG. 2 is a perspective view of the mobile object 1 from the above. In FIG. 2, FW represents a steered wheel, RW represents a drive wheel, SD represents a steering device, MT represents a motor, and BT represents a battery. The steering device SD, the motor MT, and the battery BT are included in the drive device 40. Further, AP represents an acceleration pedal, BP represents a brake pedal, WH represents a steering wheel, SP represents a speaker, and MC represents a microphone. The mobile object 1 is a one-passenger mobile object, and the occupant P is sitting on a driver seat DS with his or her seatbelt SB fastened. An arrow D1 represents the traveling direction (speed vector) of the mobile object 1. The external detection device 10 is provided around the front end of the mobile object 1, the internal camera 16 is provided at a position so as to be capable of photographing the head of the occupant P, and the mode switch 22 is provided in the boss section of the steering wheel WH. Further, the external notification device 50 serving as a display device is provided around the front end of the mobile object 1.

Referring back to FIG. 1, the storage device 70 is, for example, a non-transitory storage device such as a hard disk drive (HDD), a flash memory, or a random access memory (RAM). The storage device 70 stores, for example, navigation map information 72, a trained model 73, and other information. In FIG. 1. the storage device 70 is described outside of the control device 100, but the storage device 70 may be included in the control device 100. Further, the storage device 70 may be provided in a server (not shown).

The navigation map information 72 is stored in the storage device 70 in advance, and is map information including road boundary information or road center information on roads including a roadway and a sidewalk. The navigation map information 72 further includes information (name, address, area, and the like) on a facility or building along the boundary of a road. The trained model 73 is described later.

[Control Device]

The control device 100 includes, for example, an acquisition unit 110, a detection unit 120, and a control unit 130. The acquisition unit 110, the detection unit 120, and the control unit 130 are implemented by a hardware processor such as a CPU (Central Processing Unit) executing a program (software), for example. A part or all of these components may be implemented by hardware (circuit unit including circuitry) such as an LSI (Large Scale Integration), an ASIC (Application Specific Integrated Circuit), an FPGA (Field-Programmable Gate Array), or a GPU (Graphics Processing Unit), or may be implemented through cooperation between software and hardware. The program may be stored in a storage device (storage device including non-transitory storage medium) such as an HDD (Hard Disk Drive) or flash memory in advance, or may be stored in a removable storage medium (non-transitory storage medium) such as a DVD or CD-ROM and the storage medium may be attached to a drive device to install the program. A combination of the acquisition unit 110, the detection unit 120, and the control unit 130 is an example of "mobile object control device".

The acquisition unit 110 acquires a photographed image obtained by the external detection device 10 being an external camera photographing the surroundings of the mobile object 1. Further, the acquisition unit 110 acquires an instruction sentence indicating the stop position of the mobile object 1, which has been input by the occupant of the mobile object 1 via the HMI 20 being a sound input device. The acquisition unit 110, which has acquired the photographed image and the instruction sentence, extracts an object (landmark) corresponding to the instruction sentence in the photographed image by using a known object recognition technique. For example, when the instruction sentence indicates "Stop in front of the vending machine", the acquisition unit 110 searches a "vending machine", which is an object included in the instruction sentence, for the photographed image, and extracts the retrieved "vending machine" as a landmark.

The detection unit 120 inputs the photographed image, the instruction sentence, and the landmark into the trained model 73 to detect output coordinate information as the stop position of the mobile object 1 corresponding to the instruction sentence in the photographed image. In this case, the coordinate information may be two-dimensional coordinates or three-dimensional coordinates, and may be set freely when training data 232 described later to be used for generating the trained model 73 is prepared. The control unit 130 causes the mobile object 1 to travel to the stop position detected by the detection unit 120.

Figure 3:
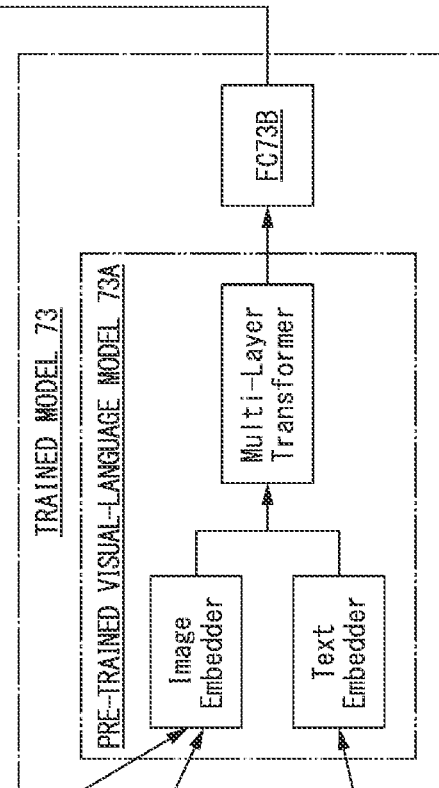
FIG. 3 is a schematic configuration of a trained model.

FIG. 3 is a schematic configuration of the trained model 73. The trained model 73 includes a pre-trained visual-language model 73A and a fully-connected layer (FC) 73B. As illustrated in FIG. 3, the trained model 73 is a model in which a FC 73B trained so as to output the stop position of the mobile object 1 as coordinate information is connected to the output layer of the pre-trained visual-language model 73A.

The pre-trained visual-language model 73A is a visual-language model trained by large-scale data in advance (in other words, before generation of trained model 73) such as UNiversal Image-Text Representation Learning (UNITER). In this case, the visual-language model means a machine learning model (multi-modal model) that has learned a feature serving as visual input and a feature serving as language input by mapping those features into a single feature space. As illustrated in FIG. 3, the pre-trained visual-language model 73A includes an image embedder module (hereinafter referred to as "IE module"), a text embedder module (hereinafter referred to as "TE module"), and a multi-layer transformer module (hereinafter referred to as "MLT module"). The feature serving as visual input extracted by the IE module and the feature serving as language input extracted by the TE module are mapped to a single feature space for training Now, details of the IE module, the TE module, and the MLT module are described.

Figure 4:
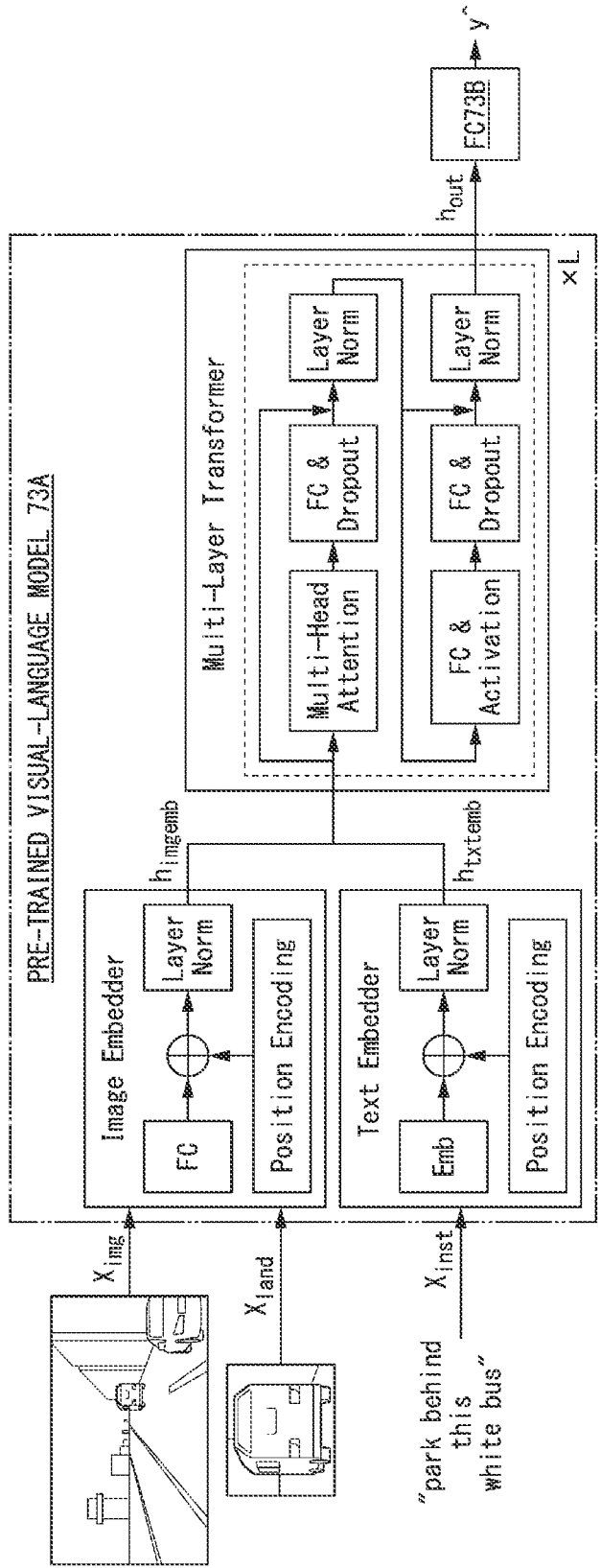
FIG. 4 is a detailed configuration of the trained model.

FIG. 4 is a detailed configuration of the trained model 73. As illustrated in the left part of FIG. 4, the parameters of the photographed image, the landmark, and the instruction sentence to be input to the IE module and the TE module are defined in the following manner.

$$x = \{X_{land}, X_{img}, X_{inst}\} \quad (1)$$

$$X_{land} = \{x_{land}, x_{landloc}\} \quad (2)$$

$$X_{img} = \{x_{img}, x_{imgloc}\} \quad (3)$$

$$X_{inst} = \{x_{inst}, x_{pos}\} \quad (4)$$

In the equations (1) to (4), $x_{land}$, $x_{landloc}$, $x_{img}$, $x_{imgloc}$, $x_{inst}$, $x_{pos}$ represent the region of the landmark, the region position of the landmark, the region of the entire photographed image, the region position of the entire photographed image, the instruction sentence, and the position of a token (minimal component forming instruction sentence) of the instruction sentence, respectively. $x_{land}$ and $x_{img}$ are obtained by normalizing the RGB values of the photographed image and then converting the photographed image into an image with the size of 224×224. After that, $x_{land}$ and $x_{img}$ are input to ResNet, which is disclosed in Non-Patent document "K. He, X. Zhang, S. Ren, and J. Sun, "Deep residual learning for image recognition", IEEE CVPR, pp. 770-778, 2016.", and the output of "conv4_x" is smoothed into one dimension to extract a feature. Regarding $x_{landloc}$, a seven dimensional vector [$x_1$/W, $y_1$/H, $x_2$/W, $y_2$/H, w/W, h/H, (w×h)/(W×H)] is obtained, where the width and height of the input image represent W and H, the upper left and lower right vertex coordinates of a square region represent ($x_1$, $y_1$) and ($x_2$, $y_2$), and the width and height of the square region represent w and h, respectively. Similarly, regarding $x_{imgloc}$, a seven dimensional vector [0, 0, 1, 1, 1, 1, 1] is obtained, where ($x_1$, $y_1$)=(0, 0), ($x_2$, $y_2$)=(W, H) is defined. Regarding $x_{inst}$, tokenization is performed by WordPieces, which is disclosed in "Y. Wu, M. Schuster, Z. Chen, et al., "Google's neural machine translation system: Bridging the gap between human and machine translation"", is obtain a token sequence $x_{inst}$ of the instruction sentence and a position $x_{pos}$ of a word in the instruction sentence. Regarding the number of dimensions of each input, for example, a feature of 1,024 dimensions is obtained for $x_{land}$ and $x_{img}$. Further, for example, a feature of 768 dimensions is obtained for each token of the instruction sentence.

In the IE module, embedding processing is performed for the landmark and the entire photographed image. The input includes $x_{land}$, $x_{landloc}$, $x_{img}$, and $x_{imgloc}$. First, $x_{land}$ and $x_{landloc}$ are each input to the fully-connected layer, and the obtained outputs are added and then normalized to obtain $h_{land}$. The above-mentioned processing is represented by the following equation.

$$h_{land} = f_{LN}(f_{FC}(x_{land}) + f_{FC}(x_{landloc})) \qquad (5)$$

Next, himg is obtained by executing processing similar to the equation (5) for $x_{img}$ and $x_{imgloc}$. Lastly, $h_{land}$ and himg are connected to obtain the output $h_{imgemb} = \{h_{land}, h_{img}\}$ of the JE module.

In the TE module, embedding processing is performed for the instruction sentence. The input includes $x_{inst}$ and $x_{pos}$. $x_{inst}$ and $x_{pos}$ are multiplied by trainable $W_{inst}$ and $W_{pos}$, added, and normalized to obtain an output $h_{txtemb}$.

$$h_{txtemb} = f_{LN}(W_{inst} x_{inst} + W_{pos} x_{pos}) \qquad (6)$$

In the MLT module and the FC 73B, the definitive predicted position of the model is obtained by an L-layered transformer. In the transformer, the features relating to the landmark, the entire image, and the instruction sentence serving as a query, a key, and a value are connected to thereby be able to obtain a relationship between different modalities. The input of the first layer is set as $h^{(1)}_{in} = \{h_{imgemb}, h_{txtemb}\}$. Next, an attention score Sattn is calculated based on the equation of the multi-head attention. In this case, head represents the number of heads of attention, i=1, . . . , head represents an index relating to head of attention, and $W^{(i)}_q$, $W^{(i)}_k$, $W^{(i)}_v$ represent trainable weights. Further, H represents a dimension d=H/head of $W^{(i)}_q h_{in}$.

$$f^{(i)}_{attn} = \text{softmax}\left(\frac{W^{(i)}_q h_{in}(W^{(i)}_k h_{in})^T}{\sqrt{d}}\right) W^{(i)}_q h_{in} \qquad (7)$$

$$S_{attn} = \{f^{(1)}_{attn}, \ldots, f^{(head)}_{attn}\}$$

Sattn is subjected to application of a fully-connected layer, dropout layer, and normalization layer, and then subject to the processing of a fully-connected layer and activation function. Lastly, the fully-connected layer, dropout layer, and normalization layer are applied again. This series of processing is defined as one transformer layer, and the output of the L-th layer is set as $h_{out}$. After that, the FC 73B is applied to obtain the definitive output $\hat{y} = f_{FC}(h_{out}) \in R^2$ of the entire model. $\hat{y}$ is represented by an absolute coordinate. A loss function L is defined in the following manner by using a Self-Adjusting Smooth L1 Loss.

$$\mathcal{L} = \begin{cases} 0.5(\hat{y} - y)^2 / \delta, & \text{if } |\hat{y} - y| < \delta \\ |\hat{y} - y| - 0.5 * \delta, & \text{otherwise} \end{cases} \qquad (8)$$

The loss function L is not limited to L1 Loss, and it suffices that the loss function L be at least a loss function that can receive continuous absolute values. A training unit 220 described later uses, for example, backpropagation to train the parameters of the FC 73B so as to decrease the value of the loss function L representing a distance between an annotation y and the absolute value $\hat{y}$.

Figure 5:
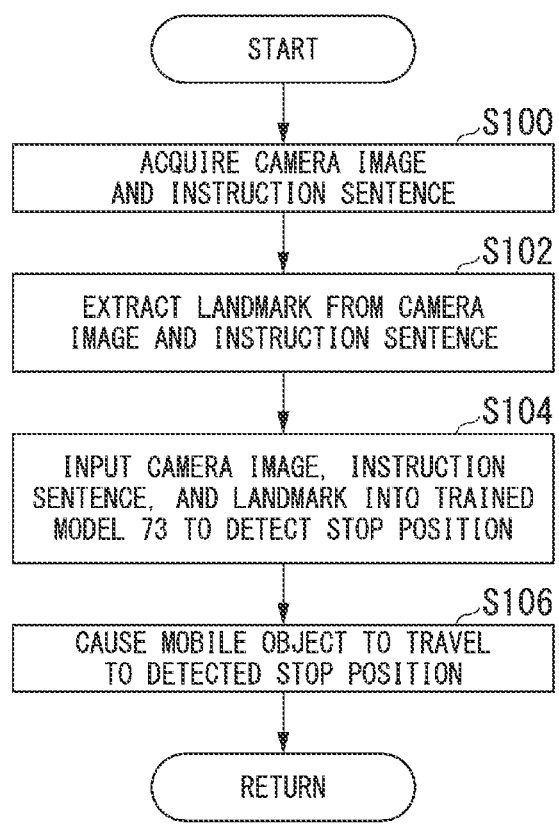
FIG. 5 is a flow chart illustrating an example of a flow of processing to be executed by the control device.

Next, referring to FIG. 5, description is given of a flow of processing to be executed by the control device 100. FIG. 5 is a flow chart illustrating an example of the flow of processing to be executed by the control device 100. The processing of the flow chart illustrated in FIG. 5 is executed at a timing at which the occupant of the mobile object 1 has uttered an instruction sentence giving an instruction indicating the stop position of the mobile object 1 toward the HMI 20 being a sound input device, for example.

First, the acquisition unit 110 acquires a photographed image obtained by the external detection device 10 being an external camera photographing the surroundings of the mobile object 1, and an instruction sentence indicating the stop position of the mobile object 1, which is input by the occupant of the mobile object 1 via the HMI 20 being a sound input device (Step S100). Next, the acquisition unit 110 uses a known object recognition technique to extract a landmark corresponding to the instruction sentence in the acquired photographed image (Step S102).

Next, the detection unit 120 inputs the photographed image, the instruction sentence, and the landmark into the trained model 73 to detect output coordinate information as the stop position of the mobile object 1 corresponding to the instruction sentence in the photographed image (Step S104). Next, the control unit 130 causes the mobile object 1 to travel to the stop position detected by the detection unit 120 (Step S106). In this manner, the processing of this flow chart is finished.

[Training Device]

Figure 6:
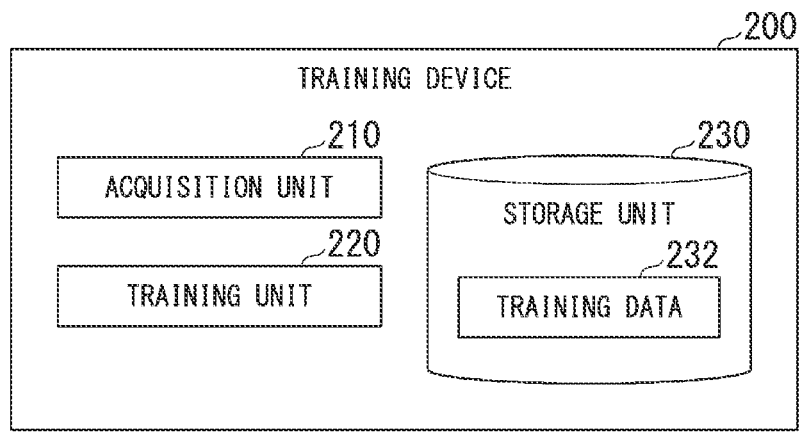
FIG. 6 is a diagram illustrating an exemplary configuration of a training device.

Next, referring to FIG. 6, description is given of a training device 200 for generating the trained model 73 according to this embodiment. FIG. 6 is a diagram illustrating an exemplary configuration of the training device 200. As illustrated in FIG. 6, the training device 200 includes, for example, an acquisition unit 210, a training unit 220, and a storage unit 230. The storage unit 230 stores training data 232, for example. The acquisition unit 210 and the training unit 220 are implemented by a hardware processor such as a CPU (Central Processing Unit) executing a program (software), for example. A part or all of these components may be implemented by hardware (circuit unit including circuitry) such as an LSI, an ASIC, an FPGA, or a GPU, or may be implemented through cooperation between software and hardware. The program may be stored in a storage device (storage device including non-transitory storage medium) such as an HDD (Hard Disk Drive) or flash memory in advance, or may be stored in a removable storage medium (non-transitory storage medium) such as a DVD or CD-ROM and the storage medium may be attached to a drive device to install the program. The storage unit 230 is implemented by a ROM, a flash memory, an SD card, a RAM, a HDD, a register, or the like.

Figure 7:
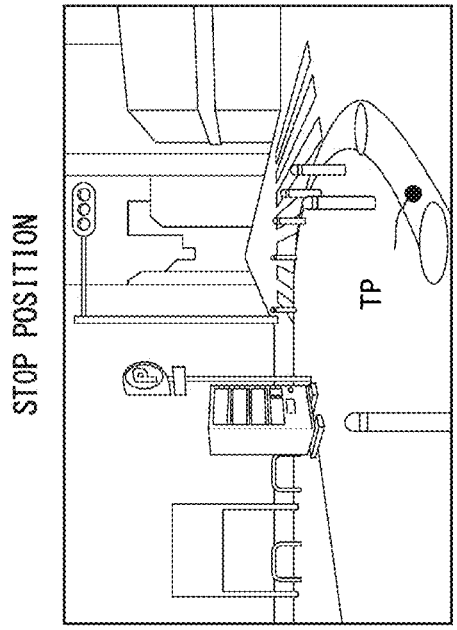
FIG. 7 is a diagram illustrating an exemplary configuration of training data.
Figure 7:
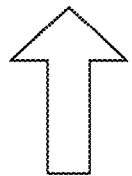
Figure 7:
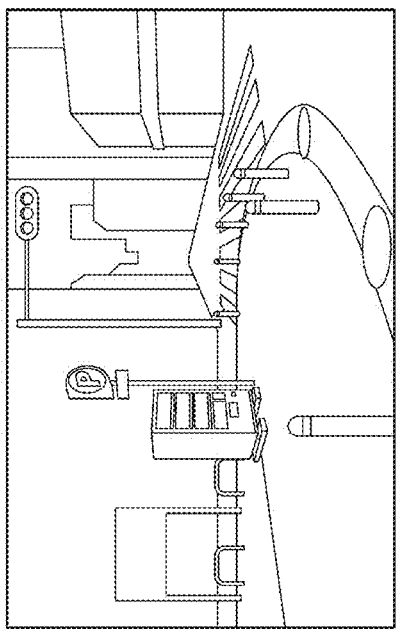
Figure 7:
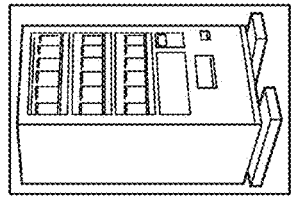

The acquisition unit 210 acquires the training data 232 from the storage unit 230. FIG. 7 is a diagram illustrating an exemplary configuration of the training data 232. As illustrated in FIG. 7, the training data 232 stores, in association with a combination of a photographed image, a landmark, and an instruction sentence, an annotation AP indicating the stop position of the mobile object 1 corresponding to the instruction sentence in the photographed image, for example.

An annotator uses, for example, a terminal device such as a personal computer to refer to a combination of the photographed image, the landmark, and the instruction sentence and assign an annotation AP to an appropriate stop position of the mobile object 1. For example, in the case of FIG. 7, the annotator refers to "vending machine" included in the instruction sentence and the image of the landmark that is an object representing "vending machine" to assign, as point information, the annotation AP to a position at which the mobile object 1 can stop and that is in front of the landmark. In this manner, in this embodiment, the annotator is not required to assign the annotation AP as a two-dimensional region on the photographed image, and it suffices that the annotator assign the annotation AP as point information. Therefore, the present invention can reduce the work load on the annotator compared to the related art of predicting the distribution or region of the target position.

Figure 8:
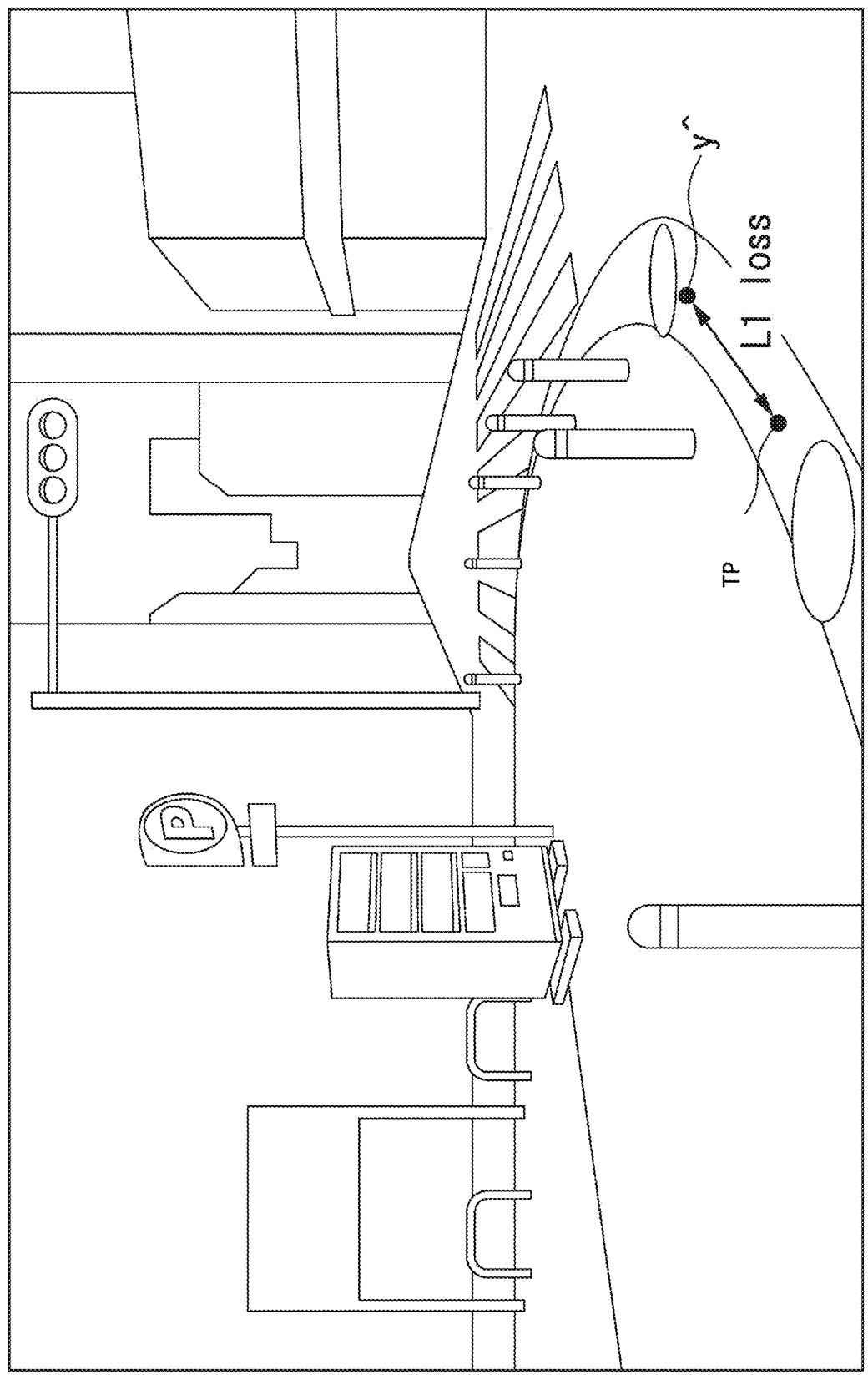
FIG. 8 is a diagram for describing machine learning to be executed by the training device.

The training unit 220 generates the trained model 73 by training a machine learning model in which the FC 73B for outputting the stop position as coordinate information is connected to the output layer of the pre-trained visual-language model 73A based on the training data 232 acquired by the acquisition unit 210. FIG. 8 is a diagram for describing machine learning to be executed by the training device 200. In FIG. 8, the reference symbol AP represents an annotation assigned as the stop position by the annotator, and the reference symbol $\hat{y}$ represents the output value of the model described with reference to FIG. 4. As illustrated in FIG. 8, the training device 200 uses, for example, back-propagation to train the parameters of the FC 73B so as to decrease the value of the loss function L (L1 loss) representing a distance between the annotation AP and a model prediction value $\hat{y}$. In this manner, the trained model 73 is generated.

In the above embodiment, the training unit 220 generates the trained model 73 by executing machine learning based on the training data 232 that stores, in association with a combination of a photographed image, a landmark, and an instruction sentence, an annotation AP indicating the stop position of the mobile object 1 corresponding to the instruction sentence in the photographed image. That is, in this embodiment, a landmark corresponding to the instruction sentence is extracted by using a known object recognition technique based on the instruction sentence, but the pre-trained visual-language model 73A may have the function of extracting a landmark corresponding to the instruction sentence.

Further, in the above embodiment, the trained model 73 outputs the stop position of the mobile object 1 in response to input of a combination of the photographed image, the landmark, and the instruction sentence. However, the present invention is not limited to such a configuration, and a target position representation (instruction sentence) may be generated from an image by applying the trained model 73.

Further, in the above embodiment, description is given of an example of the user of the mobile object 1 riding the mobile object 1 as an occupant and then using the control device 100 (more specifically, trained model 73). However, the present invention is not limited to such a configuration, and the user of the mobile object 1 may input an instruction sentence via the sound input device before riding the mobile object 1, and the control device 100 may operate based on the input instruction sentence.

Figure 9:
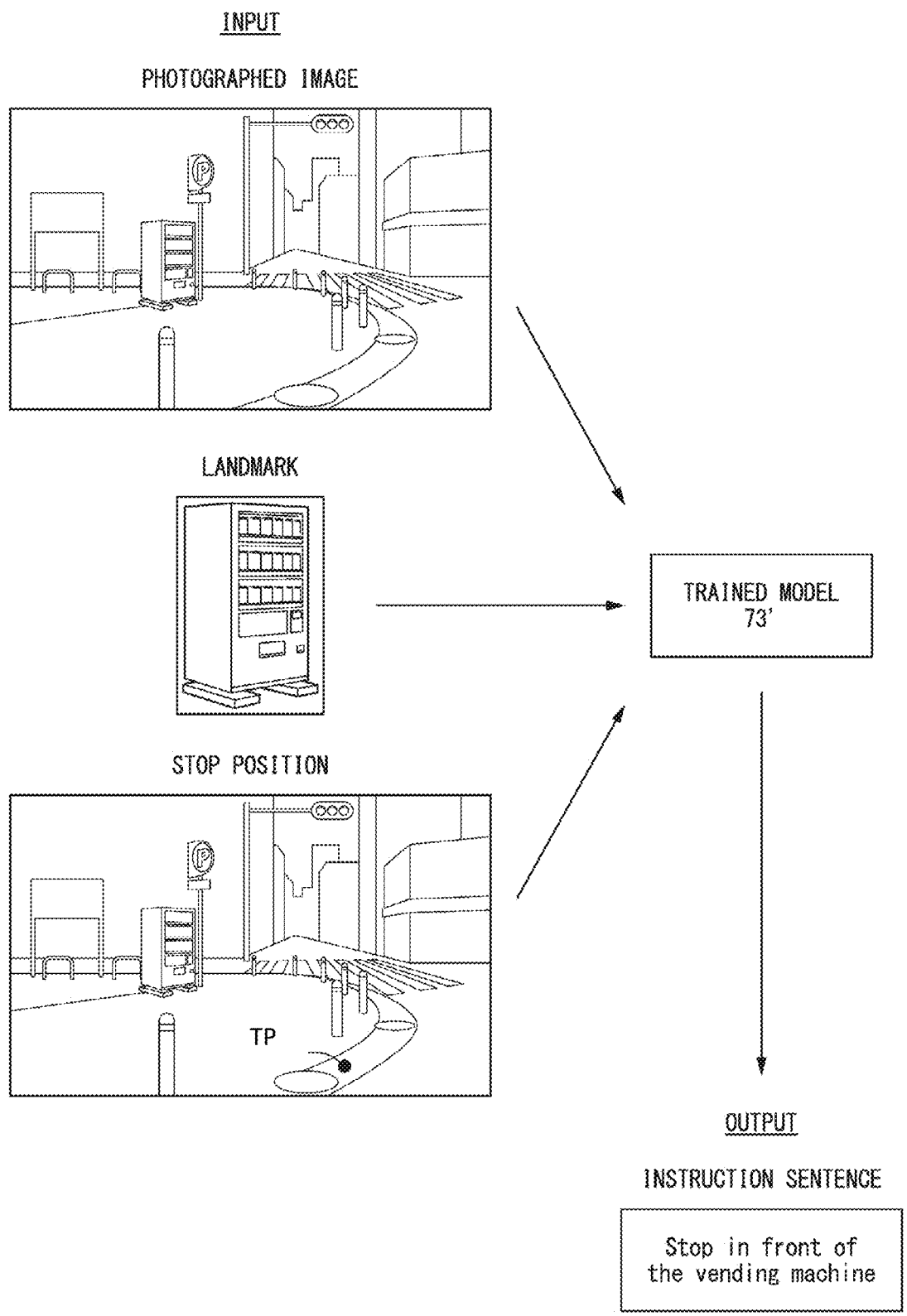
FIG. 9 is a diagram illustrating the configuration of a trained model that generates a target position representation from an image.

FIG. 9 is a diagram illustrating the configuration of a trained model 73' that generates a target position representation from an image. As illustrated in FIG. 9, the trained model 73 may be applied to construct the trained model 73' so as to output an instruction sentence in response to input of a photographed image, a landmark, and a stop position, or output an instruction sentence in response to input of a photographed image and a stop position. More specifically, first, an image and a provisional stop position (or only the image) are input to a predetermined reference representation generation module (for example, image caption generation model such as Object Relation Transformer) to generate a reference representation. After that, the reference representation generated by the reference representation generation module and the image are input to the trained model 73 to obtain the predicted stop position. If the distance between the provisional stop position and the predicted stop position falls within a predetermined threshold value, the generated reference representation is treated as an appropriate stop position representation. That is, the reference representation generation module for which the distance between the provisional stop position and the predicted stop position falls within a predetermined threshold value can be obtained as the trained model 73'.

According to this embodiment described above, the trained model 73 includes a pre-trained visual-language model 73A that has learned a wide variety of collaborative representations between a language and an image and an FC 73B that outputs the stop position as coordinate information. The control device 100 uses the trained model 73 to detect the stop position of the mobile object 1. As a result, it is possible to uniquely specify the stop position of a mobile object by using a trained model that has learned the correspondence relationship between a language and an image preferably.

The above-mentioned embodiment can be represented in the following manner.

A mobile object control device includes a storage medium storing a computer-readable command and a processor connected to the storage medium, the processor executing the computer-readable command to: acquire a photographed image, which is obtained by photographing surroundings of a mobile object by a camera mounted on the mobile object, and an input instruction sentence, which is input by a user of the mobile object; detect a stop position of the mobile object corresponding to the input instruction sentence in the photographed image by inputting at least the photographed image and the input instruction sentence into a trained model including a pre-trained visual-language model, the trained model being trained so as to receive input of at least an image and an instruction sentence to output a stop position of the mobile object corresponding to the instruction sentence in the image; and cause the mobile object to travel to the stop position.

This concludes the description of the embodiment for carrying out the present invention. The present invention is not limited to the embodiment in any manner, and various kinds of modifications and replacements can be made within a range that does not depart from the gist of the present invention.

What is claimed is:

1. A mobile object control device comprising a storage medium storing a computer-readable command and a processor connected to the storage medium, the processor executing the computer-readable command to:
   acquire a photographed image, which is obtained by photographing surroundings of a mobile object by a camera mounted on the mobile object, and an input instruction sentence, which is input by a user of the mobile object;
   detect a stop position of the mobile object corresponding to the input instruction sentence in the photographed image by inputting at least the photographed image and the input instruction sentence into a trained model including a pre-trained visual-language model; and cause the mobile object to travel to the stop position, wherein the trained model is obtained by performing training based on training data, which associates at least an image and an instruction sentence with an annotation indicating a stop position of a mobile object corresponding to the instruction sentence in the image, and the pre-trained visual-language model so as to receive input of at least an image and an instruction sentence to output a stop position of the mobile object corresponding to the instruction sentence in the image, wherein a fully connected layer is connected to an output layer of the pre-trained visual-language model and outputs the stop position as coordinate information, and wherein parameters of the fully connected layer are trained so as to decrease a value of a loss function that represents a distance between the annotation and the coordinate information.

2. The mobile object control device according to claim 1, wherein the trained model is trained so as to receive input of the photographed image, the input instruction sentence, and a landmark corresponding to the input instruction sentence to output the stop position of the mobile object corresponding to the instruction sentence in the photographed image.

3. The mobile object control device according to claim 1, wherein the trained model includes a fully connected layer that is connected to an output layer of the pre-trained visual-language model and outputs the stop position as coordinate information.

4. A mobile object control method to be executed by a computer, the mobile object control method comprising:

acquiring a photographed image, which is obtained by photographing surroundings of a mobile object by a camera mounted on the mobile object, and an input instruction sentence, which is input by a user of the mobile object;

detecting a stop position of the mobile object corresponding to the input instruction sentence in the photographed image by inputting at least the photographed image and the input instruction sentence into a trained model including a pre-trained visual-language model; and causing the mobile object to travel to the stop position, wherein the trained model is obtained by performing training based on training data, which associates at least an image and an instruction sentence with an annotation indicating a stop position of a mobile object corresponding to the instruction sentence in the image, and the pre-trained visual-language model so as to receive input of at least an image and an instruction sentence to output a stop position of the mobile object corresponding to the instruction sentence in the image, wherein a fully connected layer is connected to an output layer of the pre-trained visual-language model and outputs the stop position as coordinate information, and wherein parameters of the fully connected layer are trained so as to decrease a value of a loss function that represents a distance between the annotation and the coordinate information.

5. A non-transitory computer-readable storage medium storing a program for causing a computer to:

acquire a photographed image, which is obtained by photographing surroundings of a mobile object by a camera mounted on the mobile object, and an input instruction sentence, which is input by a user of the mobile object;

detect a stop position of the mobile object corresponding to the input instruction sentence in the photographed image by inputting at least the photographed image and the input instruction sentence into a trained model including a pre-trained visual-language model; and cause the mobile object to travel to the stop position, wherein the trained model is obtained by performing training based on training data which associates at least an image and an instruction sentence with an annotation indicating a stop position of a mobile object corresponding to the instruction sentence in the image, and the pre-trained visual-language model so as to receive input of at least an image and an instruction sentence to output the stop position of the mobile object corresponding to the instruction sentence in the image, wherein a fully connected layer is connected to an output layer of the pre-trained visual-language model and outputs the stop position as coordinate information, and wherein parameters of a fully connected layer are trained so as to decrease a value of a loss function that represents a distance between the annotation and coordinate information.

6. A training device comprising a storage medium storing a computer-readable command and a processor connected to the storage medium, the processor executing the computer-readable command to:

acquire training data associating at least an image and an instruction sentence with an annotation indicating a stop position of a mobile object corresponding to the instruction sentence in the image; and perform training based on the training data and a pre-trained visual-language model so as to receive input of at least an image and an instruction sentence to output a stop position of the mobile object corresponding to the instruction sentence in the image, wherein a fully connected layer is connected to an output layer of the pre-trained visual-language model and outputs the stop position as coordinate information, and wherein the processor is configured to train parameters of the fully connected layer so as to decrease a value of a loss function that represents a distance between the annotation and the coordinate information.

7. The training device according to claim 6, wherein the processor is configured to use training data associating the image, the instruction sentence, and a landmark corresponding to the instruction sentence with an annotation indicating a stop position of the mobile object corresponding to the instruction sentence in the image to perform training so as to receive input of the image, the instruction sentence, and a landmark corresponding to the instruction sentence to output a stop position of the mobile object corresponding to the instruction sentence in the image.

8. The training device according to claim 6, wherein the loss function receives a continuous value as an input value.

9. A training method to be executed by a computer, the training method comprising using a pre-trained visual-language model and training data associating at least an image and an instruction sentence with an annotation indicating a stop position of a mobile object corresponding to the instruction sentence in the image to perform training so as to receive input of at least an image and an instruction sentence to output a stop position of the mobile object corresponding to the instruction sentence in the image, wherein a fully connected layer is connected to an output layer of the pre-trained visual-language model and outputs the stop position as coordinate information, and wherein the training method trains parameters of a fully connected layer so as to decrease a value of a loss function that represents a distance between the annotation and the coordinate information.

10. A non-transitory computer-readable storage medium storing a program for causing a computer to use a pre-trained visual-language model and training data associating at least an image and an instruction sentence with an annotation indicating a stop position of a mobile object corresponding to the instruction sentence in the image to perform training so as to receive input of at least an image and an instruction sentence to output a stop position of the mobile object corresponding to the instruction sentence in the image,
    wherein a fully connected layer is connected to an output layer of the pre-trained visual-language model and outputs the stop position as coordinate information, and
    wherein the computer trains parameters of a fully connected layer so as to decrease a value of a loss function that represents a distance between the annotation and the coordinate information.

11. A generation device comprising one or more processor configured to generate, from at least an image and a stop position of a mobile object, an instruction sentence corresponding to the stop position in the image by using a trained model that is trained so as to receive input of at least an image and an instruction sentence to output a stop position of a mobile object corresponding to the instruction sentence in the image based on a pre-trained visual-language model and training data associating at least an image and an instruction sentence with an annotation indicating a stop position of a mobile object corresponding to the instruction sentence in the image,
    wherein a fully connected layer is connected to an output layer of the pre-trained visual-language model and outputs the stop position as coordinate information, and
    wherein parameters of the fully connected layer are trained so as to decrease a value of a loss function that represents a distance between the annotation and the coordinate information.

* * * * *